3,226,980
ACCELEROMETER

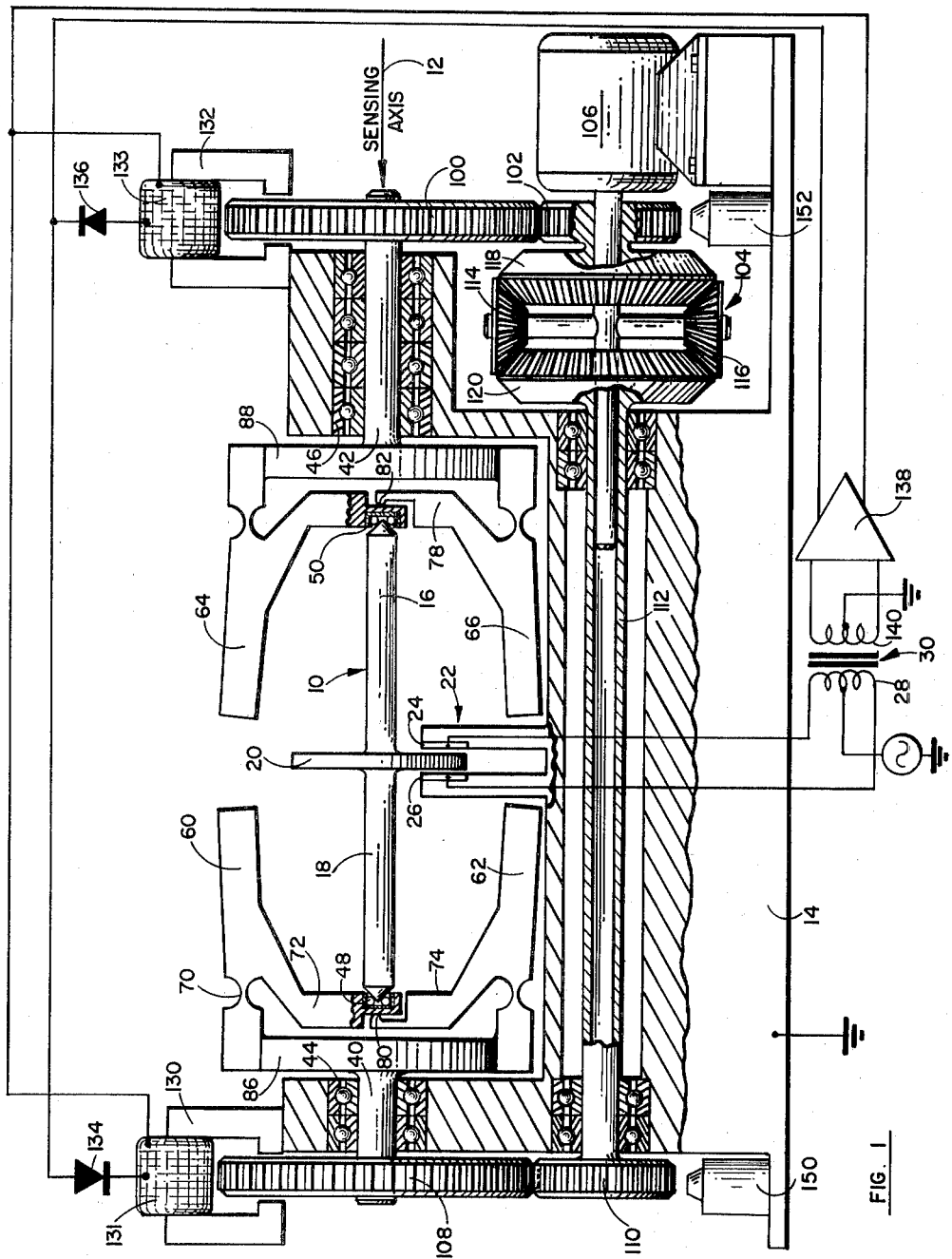

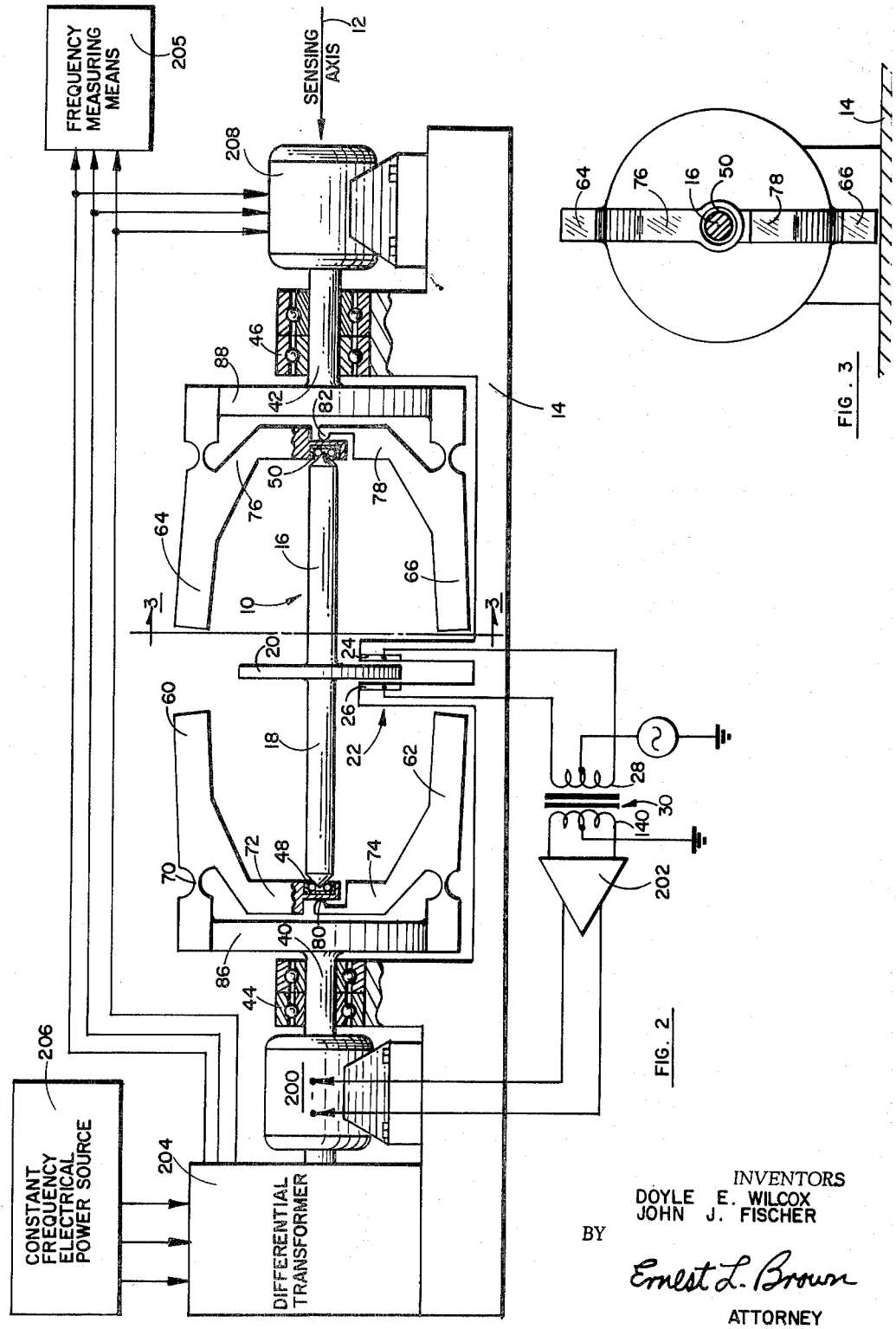

Doyle E. Wilcox, Hacienda Heights, and John J. Fischer, Fullerton, Calif., assignors to North American Aviation, Inc.
Filed Mar. 18, 1963, Ser. No. 265,712
12 Claims. (Cl. 73—517)

This invention pertains to an accelerometer, and more particularly to an accelerometer which is adapted to measure acceleration along a single axis.

Accelerometers for use in inertial guidance systems usually have a precision which is better than 0.02 percent. Accelerometers having such precision are usually of the type in which the basic accuracy is established by the strength of a magnetic or electric field and by the value of an electrical parameter such as the resistance of a resistor, the capacitance of a capacitor, or the voltage of a voltage source.

It is a major purpose of this invention to provide an accelerometer which is capable of extreme precision—for example of the order of better than 0.02 percent— in which the basic accuracy is determined by the accuracies of the dimensions of length, mass, and time.

It is therefore an object of this invention to more accurately measure acceleration.

It is another object of this invention to measure acceleration by means of an accelerometer in which the basic accuracy of the accelerometer is determined by the accuracy of the dimensions of length, mass, and time.

It is another object of this invention electro-mechanically to measure acceleration and to integrate the same to generate signals which are measures of velocity and distance.

It is a more specific object of this invention to provide a mechanism which is capable of achieving the above-enumerated objects.

Other objects will become apparent from the following description taken in connection with the accompanying drawings in which:

FIG. 1 is a partially schematic drawing, portions of which are shown in profile and portions of which are shown in section, of a first preferred embodiment of this invention;

FIG. 2 is a view, partially schematic, with portions in profile and portions in section of a second embodiment of this invention; and FIG. 3 is a view taken at 3—3 in FIG. 2.

A sensing mass 10 is supported for allowable motion along only sensing axis 12 relative to its supporting frame 14. The mass 10 is preferably, but not necessarily, symmetrical about axis 12 so that accelerations in the direction of axis 12 do not apply torques to mass 10. Mass 10 is preferably a pair of identical shafts 16 and 18 with a circular disc 20 at the center thereof. At least disc 20 is made of conducting material and is electrically connected to the frame 14. If shafts 16 and 18, together with their associated contacting structure are made of conducting material, the grounding of disc 20 may be effected by merely attaching disc 20 to shafts 16 and 18. However, if shafts 16 and 18 are made of non-conductive material, electrical connections (not shown) are needed in order to allow disc 20 to cooperate with the capacitive pickoff 22 to detect the motion of mass 10 relative to frame 14. Shafts 16 and 18 may be one shaft with the conducting disc 20 attached or—for example—shafts 16 and 18 and disc 20 may be an integral piece made from a single casting.

The capacitive pickoff 22 is shown by way of example only for detecting the relative motion between disc 20 and the capacitive plates 24 and 26. Plates 24 and 26 are mechanically attached to frame 14 but are electrically insulated therefrom. The electrical plates 24 and 26 are shown connected to a primary winding 28 of transformer 30. Alternative means for detecting the displacement of disc 20 and mass 10 relative to supporting frame 14 may be used.

A pair of colinear shafts 40 and 42 are mounted for angular rotation about sensing axis 12 relative to frame 14. Shafts 40 and 42 are shown mounted upon ball bearings 44 and 46, respectively. Other equivalent bearings may be used in place of the ball bearings 44 and 46. Shafts 40 and 42 support thrust bearings 48 and 50 which are adapted to be deflectable with mass 10 along axis 12 and to constrain mass 10 against translation in directions other than along axis 12. Thrust bearings 48 and 50 are shown as ball bearings supporting mass 10 but other equivalent thrust bearings may be used.

Each of shafts 40 and 42 has at least two centrifugal force sensing members which are shown at 60, 62, 64, and 66. The centrifugal force sensing members on each shaft are preferably dynamically balanced. In the preferred embodiment of this invention, the centrifugal force sensing members 60, 62, 64, and 66 are identical. Each of the centrifugal force sensing members, such as member 60, is hinged about a hinge line which is parallel to a tangent of its supporting shaft. For example, centrifugal force sensing member 60 is hinged about a hinge line 70 which is perpendicular to the plane of FIGS. 1 and 2 and parallel to a tangent of shaft 40. A pin hinge may be used to support the centrifugal force sensing members but a flexure hinge is shown—for example—at the hinge line 70.

Force sensing members 60, 62, 64, and 66 have levers 72, 74, 76, and 78 attached thereto to convert the inertial or centrifugal forces experienced by members 60, 62, 64, and 66 into an axial force which is applied to mass 10 along sensing axis 12. To apply the force to mass 10 along axis 12, thrust bearings 48 and 50 are shown supported upon levers 72 and 76. The forces experienced by members 62 and 66 are applied to thrust bearings 48 and 50 by means of a pair of curved bearing surfaces 80 and 82.

The members 60 and 62 are shown attached to shaft 40 by a circular hub member 86 and the members 64 and 66 are shown attached to shaft 42 by a circular hub member 88.

In the device of FIG. 1, shaft 42 is driven through a gear 100, a gear 102, a differential gear assembly 104, and a prime mover 106. Prime mover 106 is preferably a constant speed motor.

Shaft 40 is driven through gear 108, gear 110, shaft 112, differential gear assembly 104, and prime mover 106.

Prime mover 106 drives idler gears 114 and 116 of differential gear assembly 104. Gears 102 and 110 are driven by gears 118 and 120 of differential gear assembly 104 to cause the sum of the angular velocities of shafts 40 and 42 to be maintained constant.

A first electrically driven brake such as—for example—an eddy current drag brake 130 is positioned in proximity to gear 108 to generate a drag on gear 108 and shaft 40 in response to the energizing of the coil 131. A second brake 132 is positioned adjacent gear 100 to brake gear 100 and shaft 42 in response to the energizing of the coil 133. The energizing coils 131 and 133 are connected in parallel through oppositely polarized diodes 134 and 136 to the output terminals of amplifier 138 whose input is connected across the secondary winding 140 of transformer 30.

Electromagnetic pickoffs 150 and 152 are positioned adjacent gears 110 and 102 to generate signals whose frequencies are measures of the angular velocity of shafts 40 and 42, respectively. In an alternative embodiment only one of pickoffs 150 or 152 are needed.

In FIG. 2, shaft 40 is driven by a motor 200 in response to the output of amplifier 202 which is connected across the secondary winding 140 of transformer 30 to cause the velocity of motor 200 to be responsive to the displacement of disc 20 relative to the capacitive plates 24 and 26.

The shaft of motor 200 which may be, for example, a D.-C. servo motor, also drives a differential transformer 204 which is excited by a constant frequency electrical power source 206. The output of differential transformer 204 is connected to excite a synchronous motor 208 whose shaft is attached to drive shaft 42. Thus, the sum of the angular velocities of shafts 40 and 42 remains a constant proportional to the frequency of the constant frequency of voltage source 206.

Velocity pickoffs such as pickoffs 150 and 152 of FIG. 1, or only one of them, may also be used with the device of FIG. 2. A frequency measuring means 205 is shown connected to measure the excitation frequency of motor 208.

In operation, with no acceleration applied, the disc 20 remains centered between plates 24 and 26 and no signal is generated at the output of amplifier 138. Hence, neither brake 130 nor brake 132 is energized. Assuming that the mechanical characteristics of the mechanical apparatus attached to gear 40 is identical to the apparatus attached to gear 42, the idler gears 114 and 116 will not turn on their shaft and gears 118 and 120 turn at the same angular velocity.

Designate the force applied to shaft 18 by bearing 48 as $F_1$, the mass of each of the centrifugal force sensing members, such as member 60, as $m$, the distance from the hinge line of each of the centrifugal forcing members, such as hinge line 70, to the center of mass of that respective member as $d$, the distance from the sensing axis 12 to the center mass of the centrifugal force sensing mass 60 as $r$, the average angular velocity of shafts 40 and 42 as $\dot{\phi}$, the angular velocity of one of the shafts 40 and 42 as $\dot{\phi}+\dot{\Delta}$, and the angular velocity of the other shafts 40 and 42 as $\dot{\phi}-\dot{\Delta}$. Assuming that all of the sensing masses 60, 62, 64, and 66 are identical, then—for example—the force $F_1$ which is delivered by bearing 48 to shaft 18 is equal to $$m(\dot{\phi}+\dot{\Delta})^2 r \frac{d}{r} = m(\dot{\phi}+\dot{\Delta})^2 d$$

The force delivered by bearing 50 to shaft 16, designated $F_2$ is equal to $m(\dot{\phi}-\dot{\Delta})^2 d$. If the sensed acceleration is designated with the letter "$a$" and the mass of sensing mass 10 is designated M, the $Ma=2(F_1-F_2)$. Solving for "$a$,"

$$a = \frac{4m\dot{\phi}\dot{\Delta}d}{M}$$

The average angular velocity $\dot{\phi}$ is held constant by holding the angular velocity of motor 106 constant. Thus, "$a$" is proportional to the difference in angular velocity between shafts 40 and 42. The angular velocity of shaft 40 is measured by pickoff 150 and the angular velocity of shaft 42 is measured by pickoff 152. The frequencies of the signals generated by pickoff 150 and 152 can be subtracted to generate a signal, in accordance with a known art, the frequency of which is proportional to $\dot{\Delta}$.

It is apparent that since when one driving shaft 40 or 42 slows down the other shaft 42 or 40 speeds up by the same amount that the measuring of the velocity of only one shaft is necessary to generate sufficient information to measure the applied acceleration. This information may be supplied—for example—by either of pickoffs 150 or 152 or by the reading of the frequency measuring means 205 of FIG. 2.

If instead of measuring the angular velocity of shafts 40 and 42, the angles of rotation were measured, the difference between the angles of rotation would represent the first integral of the sensed acceleration, or the velocity, in the direction of the sensing axis 12.

With no acceleration applied, the disc 20 may tend to hang off its center or neutral position in which event a signal is generated at the output of amplifier 138 which is applied either to brake 130 or 132 in accordance with the polarity of the output of amplifier 138. The signal applied to brake 130 or 132 causes a braking torque to be applied to either shaft 40 or shaft 42 which reduces the force generated by levers 76 and 78 or reduces the force generated by 72 and 74. The slowing down of one of the shafts, because of the action of differential assembly 104, speeds up the other shaft. Thus, with no acceleration applied a difference in the frequencies of the signals measured by pickoffs 150 and 152 may be determined. Such a difference signal, occurring with no applied acceleration results from differences in the size and masses of the two centrifugal assemblies carried by shafts 40 and 42, and can easily be removed by electrical means (not shown) to give a resulting zero signal.

When an acceleration is applied—for example from right to left in FIG. 1—disc 20 and mass 10 start to move to the left. The slight movement to the left is detected by capacitive plates 24 and 26, is amplified by amplifier 138, and applies a signal to brake 132 which causes shaft 42 to slow down and shaft 40 to speed up. The slowing down of shaft 42 decreases the force applied by levers 76 and 78 to shaft 16 and increases the force applied by levers 72 and 74 to shaft 18 thereby centering disc 20 in pickoff 24 and 26. The difference in frequency readings between the outputs of pickoffs 150 and 152 is then a measure of the acceleration sensed by the mass 10.

In the device of FIG. 2, an acceleration of mass 10 sensed along sensing axis 12 causes disc 20 to be displaced slightly relative to plates 24 and 26. The displacement of plate 20 relative to plates 24 and 26 causes, by means of amplifier 202, motor 200 to speed up or slow down. If motor 200 speeds up, the output frequency generated by differential transformer 204 is reduced which causes motor 202 to slow down. If motor 200 slows down, the output frequency of transformer 204 increases which causes motor 208 to speed up. Differential transformer 204 and the constant frequency electrical power source 206 cause the sum of the angular velocities of shafts 40 and 42 to remain constant. The relative angular velocities may be measured and the difference in angular velocity is a measure of the acceleration sensed by sensing mass 10.

Thus, the device of this invention is a novel accelerometer which may be used to sense acceleration or velocity and, together with suitable integrating means (not shown) may be used to generate a measure of the distance of motion along the direction of sensing axis 12.

Although the device of this invention has been described in detail above, it is not intended that the invention should be limited by the description but only by the spirit and scope of the appended claims.

We claim:
1. In combination:
   a mass which is constrained against translation in all directions except along a predetermined sensing axis;
   a pair of identical rotatable forcing members adapted to generate forces which are a function of their angular velocity, positioned and mechanically connected to apply said forces along said axis to opposite sides of said mass;
   sensing means, positioned adjacent said mass to sense displacement of said mass from a predetermined neutral position and to generate signals which are a measure of said displacement;
   motive means attached to drive said rotatable members;
   servo means connected between said sensing means and said motive means to cause the sum of the angular velocities of said rotatable members to be servoed to a substantially constant value to cause said mass to be maintained at its neutral position.

2. In combination:
an acceleration sensing mass constrained against translation in all directions except along a predetermined axis;
first and second rotatable members each having at least two centrifugal force sensing members, positioned symmetrically about said axis on said sensing mass, supporting and constraining said mass and adapted to apply force to said mass along said axis in response to the centrifugal force of said rotatable members;
means for sensing displacement of said sensing mass from a predetermined position and to generate a signal which is a measured of said displacement;
motive means for driving said rotatable members so that the sum of the angular velocities is substantially constant;
servo means connected to be responsive to said sensing means to cause said rotatable members to rotate at different speeds to maintain said sensing mass at said predetermined position;
and means for measuring the relative angular velocities of said rotatable members.

3. In combination:
an acceleration sensing mass, having a predetermined sensing axis;
means for sensing displacement of said mass along said axis and for generating a signal which is a measure of said displacement;
a supporting frame;
first and second shafts mounted for angular rotation about said axis on said frame, each of said last mentioned shafts supporting a bearing along said axis, said last named bearings supporting said sensing mass and adapted to be deflectable with said mass along said axis and to constrain said mass against translation in directions other than along said axis;
at least two centrifugal force sensing members supported on each said shaft, each hinged about a hinge line which is parallel to a tangent of its supporting shaft and mounted upon said shafts to deflect radially about their said hinge line in response to the angular velocity of said shafts, said centrifugal force sensing members being levered to apply force to opposing ends of said mass in response to the angular velocity of said shafts;
means for measuring the angular velocity of said shafts;
drive means connected to said shafts;
and servo means connected between said sensing means and said drive means to cause the sum of the angular velocities of said shafts to be a constant and to cause the angular velocities of said shafts to differ by an amount which is just sufficient to maintain the position of said sensing mass at its predetermined neutral position.

4. A device as recited in claim 3 in which said drive means comprises:
a differential;
constant speed motive means connected to drive said differential;
one output member of said differential being connected to drive a first of said shafts and the other output member of said differential being connected to drive the second of said shafts.

5. A device as recited in claim 4 and further comprising:
first and second brake means connected selectively to apply braking torque to said shafts in response to said sensing means.

6. A device as recited in claim 5 in which said braking means are electromagnetic drag brakes, said sensing means are electrical sensing means, and a polarity sensitive electrical amplifying circuit is connected between said sensing means and said brakes to cause said brakes selectively to drag said shafts in stable response to the displacement of said mass.

7. A device as recited in claim 6 in which said means for measuring the angular velocity of said shafts comprises an electrical pickoff.

8. A device as recited in claim 7 in which said electrical pickoff is a magnetic pickoff and in which said sensing means is a capacitive sensor.

9. A device as recited in claim 8 in which said sensing mass is symmetrical about its sensing axis.

10. In combination:
an acceleration sensitive mass constrained against translation except along one predetermined axis;
first and second rotatable members adapted to generate forces upon said mass in opposing directions along said axis in response to their angular velocity;
means for sensing the displacement of said mass from a predetermined position;
means connected to said sensing means to control the angular velocity of said rotatable members to force said mass to remain substantially at a predetermined position relative to said sensing means;
and means for measuring the angular velocity of said rotatable members.

11. In combination:
a frame;
an acceleration sensing mass, symmetrical about a predetermined axis;
means for sensing displacement of said mass relative to said frame along said axis and for generating a signal which is a measure of said displacement;
first and second shafts mounted for angular rotation relative to said frame about said axis, each of said last mentioned shafts supporting a thrust bearing along said axis, said last named bearings supporting said sensing mass and adapted to be deflectable with said mass along said axis and to constrain said mass against translation in directions other than along said axis;
at least two centrifugal force sensing members supported on each said shaft, each hinged about a hinge line which is parallel to a tangent of its supporting shaft and mounted upon said shafts to deflect radially about their said hinge line in response to the angular velocity of said shafts, said centrifugal force sensing members being levered to apply force to opposing ends of said mass at said thrust bearings in response to the angular velocity of said shafts;
means connected to said sensing means to control the angular velocity of said shafts to force said mass to remain substantially at a predetermined position relative to said sensing means;
and means for measuring the angular velocity of said shafts.

12. In combination:
a frame;
an acceleration sensing mass, symmetrical about a predetermined axis;
means for sensing displacement of said mass relative to said frame along said axis and for generating a signal which is a measure of said displacement;
first and second shafts mounted for angular rotation relative to said frame about said axis, each of said last mentioned shafts supporting a thrust bearing along said axis, said last named bearings supporting said sensing mass and adapted to be deflectable with said mass along said axis and to constrain said mass agaifst translation in directions other than along said axis;
at least two centrifugal force sensing members supported on each of said shafts, each hinged about a hinged line which is parallel to a tangent of its supporting shaft and mounted upon said shafts to deflect radially about their said hinge line in response to the angular velocity of said shafts, said centrifugal force sensing members being levered to apply force to opposing ends of said mass at said thrust bearings in response to the angular velocity of said shafts;

a first electrical motor connected to drive a first one of said shafts in response to the output of said means for sensing displacement;

a differential transformer whose shaft is connected to be driven by the shaft of said first motor;

a constant frequency power source connected to excite said differential transformer;

an alternating current motor connected to drive the second of said shafts, said alternating current motor being electrically connected to be driven by the electrical output of said differential transformer;

and means for measuring the angular velocity of said shafts.

References Cited by the Examiner
UNITED STATES PATENTS

| | | | |
|---|---|---|---|
| 2,928,667 | 3/1960 | Peterson | 73—490 |
| 3,014,374 | 12/1961 | Johnston | 73—517 |
| 3,096,657 | 7/1963 | Cohen | 73—517 |

RICHARD C. QUEISSER, *Primary Examiner.*

JAMES J. GILL, *Examiner.*